United States Patent [19]
Gann et al.

[11] 3,802,552
[45] Apr. 9, 1974

[54] HARPOON CONVEYOR

[75] Inventors: Elbert T. Gann; Arthur W. Kauffman, both of Indianapolis, Ind.

[73] Assignee: Gann Conveyor, Incorporated, Indianapolis, Ind.

[22] Filed: Feb. 6, 1973

[21] Appl. No.: 330,075

[52] U.S. Cl. .............................................. 198/218
[51] Int. Cl. ........................................... B65g 25/04
[58] Field of Search ........................... 198/221, 218

[56] References Cited
UNITED STATES PATENTS
3,158,257   11/1964   Peras .................................. 198/221
3,659,702   5/1972   Assauer ............................. 198/221

Primary Examiner—Richard E. Aegerter
Assistant Examiner—H. S. Lane
Attorney, Agent, or Firm—Cantor and Kraft

[57] ABSTRACT

A harpoon conveyor comprising elongated trough means, reciprocating conveyor means, and support means for the reciprocating conveyor means is disclosed. The support means includes an elongated support bar fixed to the floor of the trough and running longitudinally thereof. The support bar is square in cross-section and has inverted angle iron means fixed to the upper portion to form keeper bars. The conveyor means includes a substantially V-shaped carrier bar opening downwardly with the outer portion of the wings extending substantially vertically downwardly and a pair of wear shoes secured to the inner surfaces of the wings. The carrier bar is arranged to rest on and reciprocate along the angle iron means. A pair of hold-down bars are secured to the inner surface of the outer portion of the wings to prevent the carrier bar from lifting off the support means. A plurality of spaced-apart V-shaped pusher heads are mounted on the carrier bar.

6 Claims, 5 Drawing Figures

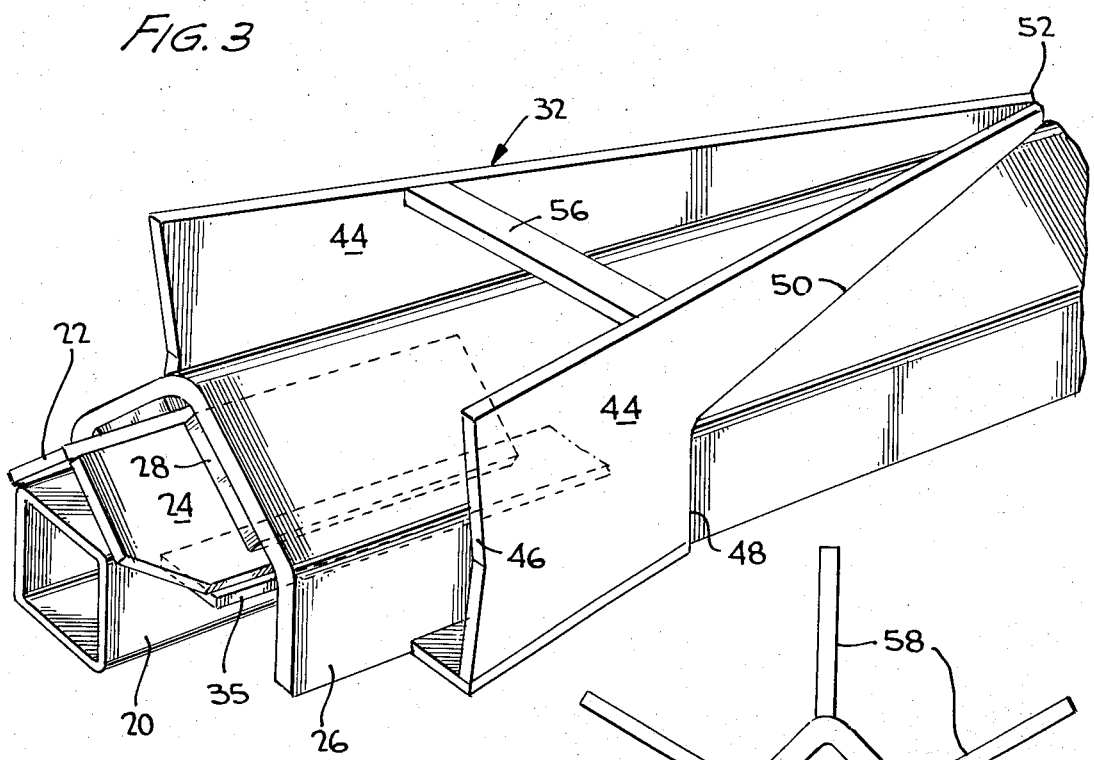
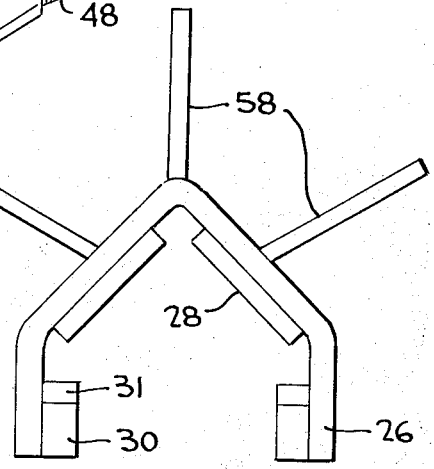
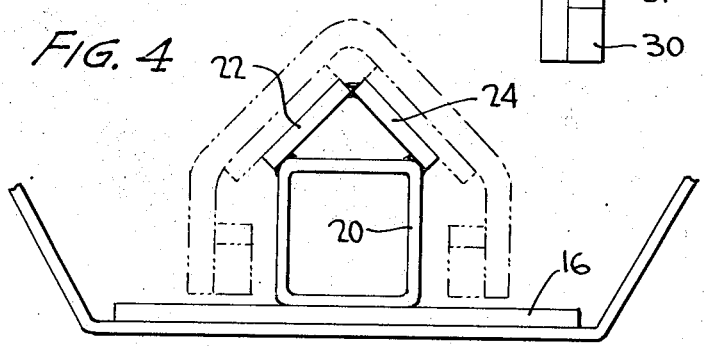

3,802,552

HARPOON CONVEYOR

BACKGROUND OF THE INVENTION

This invention relates to conveyors, and more specifically, this invention relates to conveyors for metal scraps.

Various types of conveyors for metal scrap such a filings and turnings are known in the prior art. Such conveyors are used extensively in machine shops and other manufacturing facilities where metal working is performed. Large amounts of metal filings, turnings, and the like collect in and around the machinery, these filings, turnings and the like representing reclaimable metal waste as well as creating a potential hazard to the workers. Thus, it is necessary to remove this metal waste quickly and efficiently and to convey it to some central location for disposal from the facility. This is generally done by means of a so-called "harpoon" conveyor which is usually installed at floor level, but could be suspended from the ceiling and facilitates the rapid and efficient movement of the metal waste from one location to another.

The harpoon conveyors generally comprise an elongated trough with side walls which generally taper downwardly and inwardly to a level horizontal floor. The trough is usually recessed in the floor of the manufacturing facility, but could be supported from an air plenum system or the like. The trough could be any length according to the physical layout of the facility and commonly ranges from 20 to 30 feet long to several hundred feet long. Provided within the trough, and supported on the floor thereof is a reciprocating pusher so-shaped that on its forward stroke it will push the waste and on its rearward stroke it will "plough" back through the waste. The reciprocating pusher can be powered by any known means which could be broadly classified as mechanical or hydraulic, hydraulic means including both liquid and gas actuated devices.

Various means are used for supporting and guiding the reciprocating pushers. For example, in U.S. Pat. No. 3,556,288, granted on Jan. 19, 1971 to Helmuth Assauer, the pusher blades are mounted on guide blocks which slide on a cylindrical stationary rail which is supported above the floor of the trough by posts. In another type of device disclosed in U.S. Pat. Nos. 3,112,025 and 3,175,677 granted on Nov. 26, 1963 and Mar. 30, 1965, respectively, to Lucien Peras, a conveyor is illustrated wherein the pushing members are mounted on an inverted angle iron which reciprocates on rollers which are secured to suitable supports which are affixed to the floor to the trough.

As can be readily recognized, there are two main disadvantages associated with most of the prior art harpoon conveyors. The first of these disadvantages lies in the fact that the pusher mechanism has a tendency to lift off the supporting and guiding means. Various means have been suggested for preventing lifting of the pushers, some of these prior art anti-lift devices being more effective than others. The second major disadvantage with the prior art devices resides in the fact that, due to the nature of the material being conveyed, considerable wear is experienced. Ordinarily, the pusher mechanisms are made of a wear resistant material in order to extend their useful life. Nevertheless, at some intervals, these mechanisms must be replaced. Naturally, during replacement, the conveyor is "down" resulting in a loss of productive time and money. Thus, the device must be made in such a way that parts which wear can be replaced relatively easily and quickly. On the other hand, most of the prior art devices for preventing lifting of the pusher operate at cross-purposes with the need for quick, simple replacement. Thus, a need has existed for a harpoon conveyor which is relatively simple in construction, having efficient anti-lift means, and yet made so that worn parts can be quickly and easily replaced with a minimum of down time.

It is, therefore, an object of the present invention to provide a harpoon conveyor free of the aforementioned and other such disadvantages.

It is a primary object of the present invention to provide a harpoon conveyor having a pusher assembly constructed so as to prevent lifting of the same during operation and which can be quickly and easily replaced.

It is another object of the present invention to provide a harpoon conveyor having an improved and efficient pusher assembly. It is yet another object of the present invention to provide a harpoon conveyor constructed so as to minimize collection of metal scrap beneath the pusher mechanism.

Consistent with the foregoing objects, the conveyor assembly of the present invention comprises elongated trough means, reciprocating conveyor means, and support means for the reciprocating conveyor means. The support means comprises an elongated support bar fixed to the floor of the trough means and running longitudinally thereof, the support bar being square in cross-section, and inverted angle iron means fixed to the upper portion of the support bar. The conveyor means comprises a substantially V-shaped carrier bar means opening downwardly with the outer portion of the wings extending substantially vertically downwardly and a pair of wear shoes secured to the inner surfaces of the wings. The carrier bar means is arranged to rest on and reciprocate along the angle iron means which forms keeper means. A pair of hold-down bars are secured to the inner surface of the outer portion of the wings to prevent the carrier bar means from lifting off the support means. A plurality of spaced-apart V-shaped pusher head means are mounted on the carrier bar means.

BRIEF DESCRIPTION OF THE DRAWINGS

This invention will be better understood, and objects other than those set forth above will become apparent when consideration is given to the following detailed description thereof. Such description makes reference to the annexed drawings wherein:

FIG. 3 is a fragmentary perspective view of the conveyor assembly of the present invention;

FIG. 4 is a partially fragmentary vertical cross-sectional view showing one aspect of the present invention; and FIG. 5 is a front elevation of another embodiment of the conveyor means.

DESCRIPTION OF THE PREFERRED EMBODIMENTS

Figure 1:
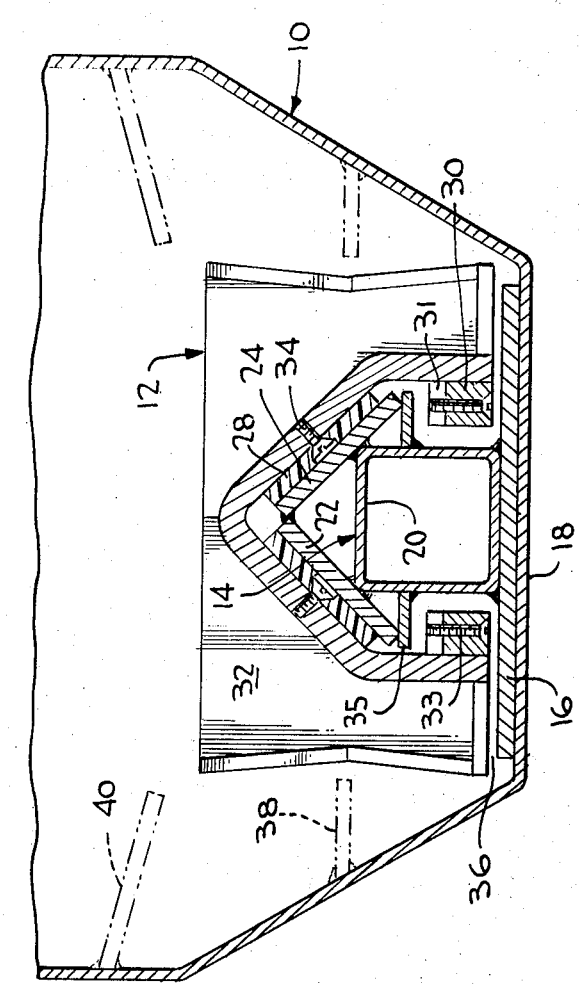
FIG. 1 is a vertical cross-sectional view of the conveyor assembly of the instant invention.

Referring first to FIG. 1, it will be seen that the conveyor assembly of the instant invention generally comprises trough means 10, reciprocating conveyor means 12, and support means 14.

The support means 14 includes mounting plate 16 fixed to the floor 18 of trough 10. An elongated support bar 20 running longitudinally of trough 10 is fixed to mounting plate 16. A pair of keeper bars 22 and 24 are permanently fixed as by welding to the upper corners of support bar 20 in such a way as to form an inverted V, in essence forming an angle iron, and a pair of steel anti-lift shoe wear bars 35 are fixed to the sides of support bar 20. The support bar 20 is constructed of tubing having a generally square cross-section.

The reciprocating conveyor means 12 generally comprises carrier bar means 26, wear shoes 28, hold-down bars 30, anti-lift wear shoes 31, and pusher head means 32. The carrier bar means 26 is substantially V-shaped and opens downwardly with the outer portion of the wings extending substantially vertically downwardly. The carrier bar means 26 is elongated and runs longitudinally of the trough. The complete conveyor assembly is made up of a plurality of shorter lengths of conveyor means, typically the carrier bar means 26 being about 10 feet long. At each end of each length is provided a pair of wear shoes 28 made of any material which has low friction characteristics with some flexibility. Such materials include Nylatron which is a nylon composition containing graphite. Other materials having these characteristics are Teflon (polytetrafluoroethylene), bronze, and the like. The wear shoes 28 are attached to the carrier bar means 26 in such a way as to be easily removable for replacement. As shown in FIG. 1, a countersunk hole is provided for a suitable bolt 34.

As can be readily appreciated, when the apparatus is in operation there will be a tendency for the reciprocating conveyor means 12 to lift from the support means 14. In order to overcome this tendency, hold-down bars 30 are provided. Hold-down bars 30, preferably made of steel and running the full length of the section, are fixed to the downwardly projecting wings of carrier bar means 26 by suitable conventional means such as welding. Anti-lift wear shoes 31 are made of the same type of material as wear shoes 28, and preferably Nylatron, and are fixed to hold-down bars 30 by suitable means such as screws 33. In operation, if reciprocating conveyor means 12 tends to lift off support means 14, anti-lift wear shoes 31 will engage anti-lift shoe wear bars 35, thereby preventing any lift. It should also be noted that a small space is provided between reciprocating conveyor means 12 and mounting plate 16, this space being designated by the number 36. The provision of the space assists in reducing wear and lift. In order to provide more efficient operation, when working with certain types of materials, stators 38 and 40 are provided.

Figure 2:
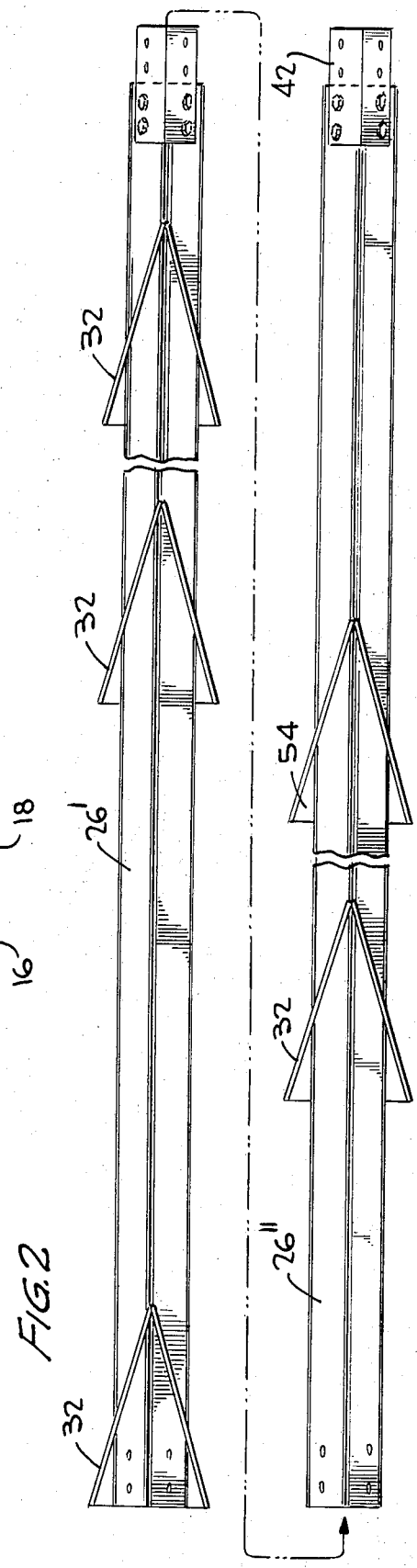
FIG. 2 is a partially fragmentary plan view of the pusher means.

Attention is now directed to FIG. 2 wherein a portion of a conveying apparatus according to the instant invention is depicted in plan view. As mentioned above, the carrier bar means 26 is made in sections of a convenient length for manufacture, installation, and removal. A plurality of pusher head means 32 are mounted at spaced intervals along the carrier bar means. The various sections of the carrier bar means, designated in FIG. 2 as 26' and 26" are joined by means of splice plates 42 which are merely bolted on to the ends of the carrier bar means. Any suitable means for joining the sections of carrier bar means may be used.

Turning now to FIG. 3, the configuration of pusher head means 32 and its relationship with carrier bar means 26, support bar means 20, keeper bars 22 and 24, and wear shoes 28 is shown. Pusher head means 32 is made up of a pair of planar members 44 joined at their rearward end portion to form an apex so that in plan view such as in FIG. 2 they form a V-shaped pusher. Each member 44 has a forward edge portion 46 which is notched to provide better grip on the scrap and, therefore, better pushing action. The forward portion of member 44 terminates in a rear shoulder 48. Member 44 then tapers rearwardly along rear portion 50 to the rear end portion where the apex 52 is reached. The angle at which rear portion 50 tapers rearwardly is chosen such that the rear portion 50 of member 44 rests on carrier bar means 26. In order to avoid collection of scrap below pusher head 32, anti-packing wedge 54 is provided. Also, a flat strip 56 could be welded across pusher head 32 to prevent separation of members 44.

It has already been seen in FIGS. 1 and 3 how keeper bars 22 and 24 overhang support bar 20 and terminate at anti-lift shoe wear bars 35 so that any tendency for the pusher assembly to lift will be prevented when anti-lift wear shoes 31 catch on the anti-lift shoe wear bars 35. It has also been described how the reciprocating conveyor means 12 is assembled in sections for ease of manufacture, assembly, and disassembly. In fact, the support means 14 is also manufactured in sections. Generally, the support means 14 is constructed as shown in FIGS. 1 and 3. Alternate sections, however, vary to the extent, as shown in FIG. 4, that keeper bars 22' do not extend beyond the upper corners of support bar 20 at their lower end portions and anti-lift wear bars 35 are omitted. Thus, when it is desired to remove one or more sections of the pusher assembly 12, the pusher assembly is moved to a position wherein the hold-down bars 30 and shoes 31 are aligned with keeper bars 22' and 24' having no overhang. At this point, the particular section of pusher assembly 12 which is aligned with a section of keeper bars 22' and 24' can merely be unbolted at the splice plates 42 and lifted out of the apparatus.

While an embodiment showing a pusher head suitable for moving cast iron, sand and fine materials has been shown by reference to FIGS. 1, 2, and 3, other configurations could be used for moving other materials. For instance, in FIG. 5 there is shown a pusher head suitable for moving steel punchings and turnings. This alternate embodiment has a plurality of pusher head blades 58 affixed to carrier bar means 26, replacing pusher head 32. The pusher head blades 58 are generally triangular when viewed in side elevation.

It should be apparent from the foregoing detailed description that the objects set forth hereinabove have been successfully achieved. Moreover, while there is shown and described a present preferred embodiment of the invention it is to be distinctly understood that the inventin is not limited thereto, but may be otherwise variously embodied and practiced within the scope of the following claims. Accordingly,

What is claimed is:

1. A conveyor assembly for metal scrap comprising elongated trough means, reciprocating conveyor means, and support means for said reciprocating conveyor means; said support means comprising: an elongated support bar fixed to the floor of said trough means and running longitudinally thereof, said support bar being square in cross-section, anti-lift shoe wear bar means extending outwardly from the sides of said support bar, and inverted angle iron means fixed to the upper portion of said support bar; and said conveyor means comprising a substantially V-shaped carrier bar means opening downwardly with the outer portion of the wings thereof extending substantially vertically downwardly, a pair of wear shoes secured to the inner surfaces of said wings, said carrier bar means being arranged to rest on and reciprocate along said keeper bars, a pair of hold-down bars having anti-lift wear shoes on the upper surfaces thereof secured to the inner surface of said outer portion of said wings to prevent said carrier bar means from lifting off said support means, and a plurality of spaced-apart V-shaped pusher head means mounted on said carrier bar means.

2. A conveyor assembly as dined in claim 1, wherein said inverted angle iron means is defined by a pair of flat keeper bars fixed to said support bar at the upper corners thereof and meeting at their upper ends to form an inverted V.

3. A conveyor assembly as defined in claim 1, wherein said wear shoes comprise an at least partially flexible material having low friction characteristics.

4. A conveyor assembly as defined in claim 1, wherein said suport means is made up of a plurality of sections and said inverted angle iron means overhang said support bar in alternate sections.

5. A conveyor assembly as defined in claim 1, wherein said pusher head means comprises a pair of planar members joined at their rearward end portions to form an apex thereby forming a V-shaped pusher means when viewed from above, each of said planar members having a notched forward edge portion a forward portion which terminates in a rear shoulder, and a rear portion tapering upwardly and rearwardly from said shoulder to the rear end thereof to thereby form said apex.

6. A conveyor assembly as defined in claim 1, wherein said pusher head means comprises a plurality of pusher head blades.

\* \* \* \* \*